US012731857B2

(12) United States Patent
Hwang et al.

(10) Patent No.: US 12,731,857 B2
(45) Date of Patent: Sep. 8, 2026

(54) SEPARATOR FOR SECONDARY BATTERY, MANUFACTURING METHOD THEREOF, AND LITHIUM SECONDARY BATTERY

(71) Applicant: SK ON CO., LTD., Seoul (KR)

(72) Inventors: Chang Mook Hwang, Daejeon (KR); Hyun Ji Kim, Daejeon (KR); Jong Hyeok Lee, Daejeon (KR); Yoon Ji Jo, Daejeon (KR)

(73) Assignee: SK On Co., Ltd., Seoul (KR)

( * ) Notice: Subject to any disclaimer, the term of this patent is extended or adjusted under 35 U.S.C. 154(b) by 81 days.

(21) Appl. No.: 18/496,762

(22) Filed: Oct. 27, 2023

(65) Prior Publication Data

US 2024/0145862 A1 May 2, 2024

(30) Foreign Application Priority Data

Oct. 28, 2022 (KR) ........................ 10-2022-0141111

(51) Int. Cl.

| | |
|---|---|
| ***H01M 50/403*** | (2021.01) |
| ***H01M 50/406*** | (2021.01) |
| ***H01M 50/431*** | (2021.01) |
| ***H01M 50/434*** | (2021.01) |
| ***H01M 50/443*** | (2021.01) |
| ***H01M 50/446*** | (2021.01) |

(52) U.S. Cl.

CPC ....... *H01M 50/406* (2021.01); *H01M 50/431* (2021.01); *H01M 50/434* (2021.01); *H01M 50/443* (2021.01); *H01M 50/446* (2021.01)

(58) Field of Classification Search

None

See application file for complete search history.

(56) References Cited

U.S. PATENT DOCUMENTS 4,410,383 A * 10/1983 Lipari ................. B29C 66/8161 156/80
5,800,758 A * 9/1998 Topolkaraev ............. C08J 5/18 264/154
2016/0064711 A1* 3/2016 Zhao ....................... B29C 48/91 264/45.9

(Continued)

FOREIGN PATENT DOCUMENTS

EP 3588611 A1 1/2020
EP 3866219 A1 8/2021

(Continued)

OTHER PUBLICATIONS

European Search Report issued in EP Patent Application No. 23206552.4, dated Mar. 15, 2024, 10 pages.
KIPO, Appl. 10-2022-0141111, Office Action, Jun. 24, 2026.

*Primary Examiner* — Matthew J Daniels
(74) *Attorney, Agent, or Firm* — Jones Day

(57) ABSTRACT

Provided are a separator for a secondary battery, a manufacturing method thereof, and a lithium secondary battery including the same, having appropriate porosity and an appropriate pore size to lead to excellent strength and safety, and having excellent ion conductivity and resistance characteristics due to interconnected pore passages. The manufacturing method of a separator for a secondary battery includes: molding a separator manufacturing composition into a separator manufacturing sheet; and extracting a diluent from the separator manufacturing sheet with a polar aprotic organic solvent.

6 Claims, 2 Drawing Sheets

(56) References Cited

U.S. PATENT DOCUMENTS

| | | | |
|---|---|---|---|
| 2021/0050575 | A1 | 2/2021 | Park et al. |
| 2022/0209364 | A1 | 6/2022 | Okazaki et al. |
| 2023/0046375 | A1 | 2/2023 | Zhang et al. |
| 2023/0307789 | A1 | 9/2023 | Kwon et al. |

FOREIGN PATENT DOCUMENTS

| | | | |
|---|---|---|---|
| EP | 3866220 | A1 | 8/2021 |
| EP | 3920299 | A1 | 12/2021 |
| EP | 4009437 | A1 | 6/2022 |
| JP | 2003-178741 | A | 6/2003 |
| KR | 10-1145583 | B1 | 5/2012 |
| KR | 10-2017-0044499 | A | 4/2017 |
| KR | 10-2020-0000372 | A | 1/2020 |
| KR | 10-2313082 | B1 | 10/2021 |
| KR | 10-2021-0133269 | A | 11/2021 |
| KR | 10-2022-0043920 | A | 4/2022 |
| KR | 20220108791 | A | 8/2022 |
| KR | 10-2022-0128244 | A | 9/2022 |

* cited by examiner

SEPARATOR FOR SECONDARY BATTERY, MANUFACTURING METHOD THEREOF, AND LITHIUM SECONDARY BATTERY

CROSS-REFERENCE TO RELATED APPLICATION(S)

This patent document claims the priority and benefits of Korean Patent Application No. 10-2022-0141111 filed on Oct. 28, 2022, the disclosure of which is incorporated herein by reference in its entirety.

TECHNICAL FIELD

The technology and example embodiments disclosed in the patent document relate to a separator for a secondary battery, a manufacturing method thereof, and a lithium secondary battery, and, in particular, to a separator for a secondary battery, a manufacturing method thereof, and a lithium secondary battery.

BACKGROUND

As interest in environmental issues has increased, various efforts for addressing environmental issues are replacing fossil fuel-powered vehicles, which are one of the main causes of adverse effects such as air pollution and greenhouse emissions, with electric vehicles (EVs) and providing battery based energy storage systems (ESS) to store renewable energy such as solar power and wind power. Lithium secondary batteries can be used for electric vehicles (EVs), power storage systems, portable electronic devices, and other electrically powered device and systems.

SUMMARY

In an aspect, the technology disclosed in this patent document may be implemented to provide a secondary battery that includes a separator having pores, thereby exhibiting excellent ion conductivity and safety. In another aspect, a lithium secondary battery may include a separator having a pore shape.

In another aspect, the technology disclosed in this patent document may be implemented to provide a manufacturing method of a separator for a secondary battery configured to appropriately adjust porosity and pore size, and change a pore shape.

A method for manufacturing a separator for a secondary battery based on an embodiment includes: molding a separator manufacturing composition (separator composition) to form a separator manufacturing sheet (separator composition sheet); and forming a separator by extracting a diluent from the separator manufacturing sheet using a polar aprotic organic solvent.

A dielectric constant value of the polar aprotic organic solvent may range from 10 to 100.

The polar aprotic organic solvent may include one of acetone, chloroacetone, dimethylformamide, or a combination of two or more of acetone, chloroacetone, and dimethylformamide.

The separator manufacturing composition may further include polar powder particles.

A dielectric constant value of the polar powder particles may range from 3 to 5000.

The polar powder particles may include at least one of calcium carbonate ($CaCO_3$), silicon dioxide ($SiO_2$), aluminum oxide ($Al_2O_3$), zirconium oxide ($ZrO_2$), hafnium oxide ($HfO_2$), hafnium silicate ($HfSiO_4$), tantalum pentoxide ($Ta_2O_5$), lanthanum oxide ($La_2O_3$), lanthanum aluminate ($LaAlO_3$), niobium pentoxide ($Nb_2O_5$), titanium dioxide ($TiO_2$), barium titanate ($BaTiO_3$), or strontium titanate ($SrTiO_3$).

The manufacturing method of a separator for a secondary battery may include applying an ultrasonic treatment to the separator manufacturing sheet, between the molding of the separator manufacturing composition and the extracting the diluent.

A separator for a secondary battery based on an embodiment is formed by performing the method of a separator for a secondary battery according to any one of the aforementioned embodiments.

A lithium secondary battery based on an embodiment includes the separator for a secondary battery according to any one of the aforementioned embodiments.

In an embodiment of the disclosed technology, a separator for a secondary battery such as a lithium secondary battery may have appropriate porosity and an appropriate pore size to exhibit excellent strength and safety, and excellent ion conductivity and resistance characteristics due to interconnected pore passages.

In another embodiment of the disclosed technology, a manufacturing method of a separator for a secondary battery may form a microporous structure such that a separator may have appropriate porosity and an appropriate pore size and each pore has an interconnected shape.

BRIEF DESCRIPTION OF DRAWINGS

Certain aspects, features, and advantages of the disclosed technology are illustrated by the following detailed description with reference to the accompanying drawings.

DETAILED DESCRIPTION

Section headings are used in the present document only for ease of understanding and do not limit scope of the embodiments to the section in which they are described.

The disclosed technology can be implemented in some embodiments to provide a separator for a secondary battery, a manufacturing method thereof, and a lithium secondary battery having excellent strength, stability and ion conduction characteristics by appropriately adjusting a pore shape.

A lithium secondary battery may include a cathode, an anode, a separator, and electrolyte. The separator is interposed between the cathode and the anode to electrically insulate the cathode and the anode from each other. In some implementations, the separator may include a porous membrane through which ions included in the electrolyte selectively pass. Generally, separators have characteristics such as 1) thin thickness, 2) high strength, 3) electrochemical stability, 4) thermal stability, and 5) a microporous structure. The microporous structure may be created when the separator has high porosity and small, uniform pore sizes. In general, with an increase in the porosity and pore size, an electrolyte content increases, thus ions can easily move through the separator, but, in this case, since a lithium dendrite formed on a surface of the anode tends to growth, there may be safety issues associated with the separator. Furthermore, when the pore size excessively increases, since the size of the pores may be greater than the size of a transition metal, a transition metal other than the lithium metal may undesirably pass through the separator. In order to address these issues, the disclosed technology can be implemented in some embodiments to provide a separator for a secondary battery having a microporous structure that can ensure ion conduction characteristics and safety.

In some implementations, in a microporous structure of a separator used in a lithium secondary battery, as a porosity and a pore size increase, the separator has excellent ion conduction characteristics, but there may be safety issues as discussed above. The disclosed technology can be implemented in some embodiments to provide a separator having a microporous structure capable of improving ion conduction characteristics and resistance characteristics, while maintaining porosity and a pore size within an appropriate range.

In some embodiments of the disclosed technology, when pores in a separator having appropriate porosity and an appropriate pore size are interconnected to form a whirlwind-shaped or screw-shaped passage inside the separator, a separator implemented as will be discussed below with reference to FIGS. 1A to 1C can address the issues discussed above.

Figure 1A:
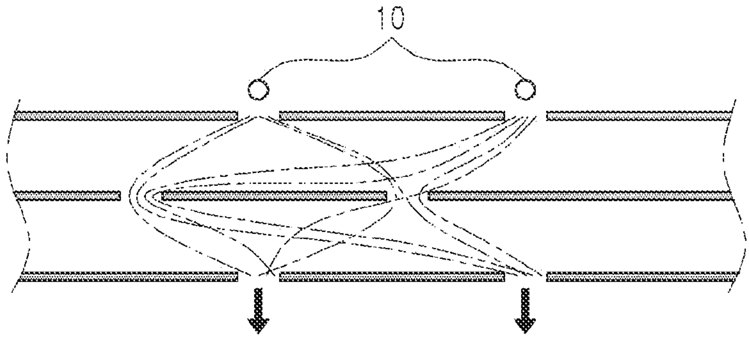
FIG. 1A is a schematic diagram schematically illustrating a movement path of ions passing through pores in an example separator for a secondary battery.

FIG. 1A is a schematic diagram schematically illustrating a movement path of ions passing through pores in an example separator for a secondary battery.

Figure 1B:
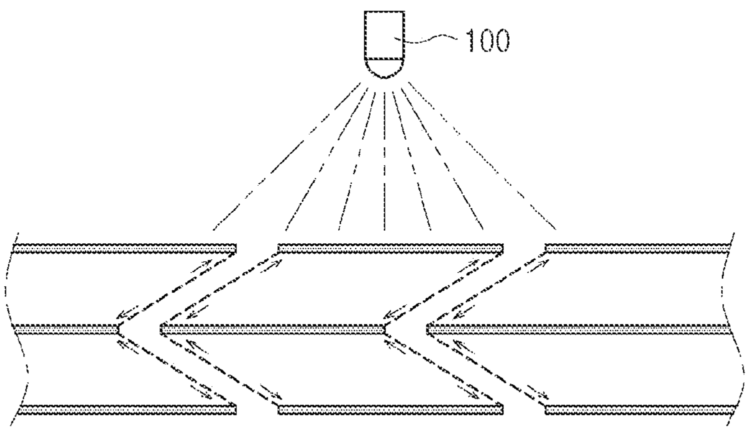
FIG. 1B is a schematic diagram schematically illustrating a process of forming interconnected pore structures in a separator for a secondary battery based on an embodiment of the disclosed technology.

FIG. 1B is a schematic diagram schematically illustrating a process of forming a passage that is formed by interconnected pores in a separator for a secondary battery based on an embodiment of the disclosed technology.

Figure 1C:
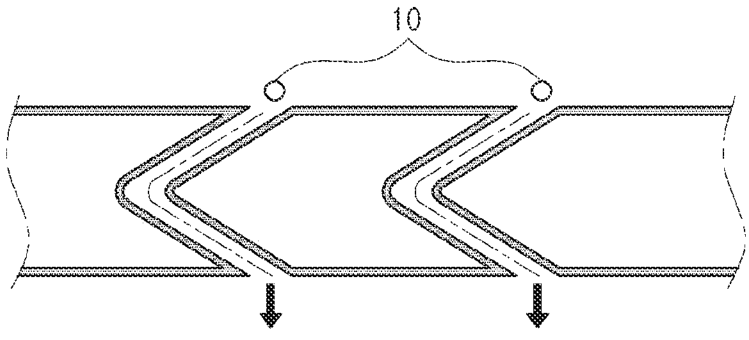
FIG. 1C is a schematic diagram schematically illustrating a movement path of ions passing through a passage formed by pores interconnected in a separator for a secondary battery based on an embodiment of the disclosed technology.

FIG. 1C is a schematic diagram schematically illustrating a movement path of ions passing through a passage formed by pores interconnected in a separator for a secondary battery based on an embodiment of the disclosed technology.

Manufacturing Method of Separator for Secondary Battery

A manufacturing method of a separator for a secondary battery includes: molding a separator manufacturing composition (e.g., separator composition) to form a separator manufacturing sheet (e.g., separator composition sheet); and extracting a diluent from the separator manufacturing sheet using a polar aprotic organic solvent.

In some implementations, a manufacturing method of a separator for a secondary battery using a wet method includes 1) a method (e.g., phase 2) of using a separator manufacturing composition including a polymer and a diluent, and 2) a method (e.g., phase 3) of using a separator manufacturing composition including a polymer, a diluent, and powder particles. A separator manufacturing composition having a single phase may be formed from the polymer, diluent, etc. through roll mixing milling, and the separator manufacturing composition may be melted and extruded and may be sheeted and cooled down, thus inducing phase-separation. In an implementation, after stretching a phase-separated sheet, the diluent may be extracted with an organic solvent. In another implementation, the diluent may first be extracted from the phase-separated sheet with the organic solvent and may then be stretched and molded in a film shape, and the diluent may be fixed with heat, thereby manufacturing a separator for a secondary battery.

In some embodiments of the disclosed technology, when applying a polar aprotic organic solvent in extracting a diluent, pores of an appropriate size may be interconnected to each other to form a separator having a whirlwind-shaped or screw-shaped passage formed therein. The separator implemented based on some embodiments of the disclosed technology may have excellent performance by satisfying the characteristics required for a separator for a secondary battery. Hereinafter, a manufacturing method of a separator for a secondary battery based on an embodiment will be described in detail with reference to FIGS. 1A to 1C.

A dielectric constant value of the polar aprotic organic solvent may be from 10 to 100. Specifically, the dielectric constant value of the polar aprotic organic solvent may be from 15 to 80. When an organic solvent used in the extraction of the diluent is polar, a whirlwind-shaped or screw-shaped passage in which pores having an appropriate size are interconnected with each other may be more easily formed. Furthermore, when an organic solvent used to extract the diluent is protic, a large amount of hydrogen ions ($H^+$) may be generated due to an organic solvent remaining inside the separator, and hydrofluoric acid (HF) formed by bonding the hydrogen ions with fluorine ions ($F^-$) present inside the secondary battery may destroy a solid electrolyte interface (SEI) layer on a surface of an electrode, thereby accelerating an occurrence of gas. Accordingly, when the organic solvent used to extract the diluent is aprotic, the amount of gas occurring in the battery may be reduced as described above, thereby achieving excellent safety and life cycle characteristics.

The polar aprotic organic solvent may include acetone, chloroacetone, dimethylformamide, or a combination of two or more of acetone, chloroacetone, dimethylformamide.

Referring to FIG. 1A, in the case of a microporous structure of the example separator for a secondary battery, since lithium ions 10 may pass through a plurality of pores, movement paths thereof may vary. Accordingly, the lithium ions passing through the separator move through an irregularly formed passage rather than a preset passage. In this case, since no acceleration occurs when the lithium ions move through the separator, it may be difficult to improve an ion transfer speed.

On the other hand, referring to FIGS. 1B to 1C, in the separator for a secondary battery based on an embodiment, whirlwind-shaped or screw-shaped passages in which pores are interconnected may be formed in the separator by the ultrasonic treatment device 100, and the lithium ions 10 move through the passages. When the lithium ions rotate and move along the whirlwind-shaped or screw-shaped passages, rotational acceleration may occur, thereby improving a movement speed of lithium ions. Accordingly, unlike the example separator for a secondary battery as illustrated in FIG. 1A, a separator for a secondary battery implemented based on some embodiments of the disclosed technology may have a microporous structure capable of further improving the transfer speed of lithium ions moving fast during fast charging.

The separator manufacturing composition may be a two-phase composition including a polymer and a diluent, or may be a three-phase composition including a polymer, a diluent, and polar powder particles.

The polymer may correspond to a porous substrate included in a finally manufactured separator for a secondary battery, and may be a polyolefin-based polymer. The polyolefin-based polymer may include, for example, polyethylene, polypropylene or a combination of polyethylene and polypropylene, but the disclosed technology is not limited thereto. When the separator manufacturing composition includes the polymer described above, a microporous structure of a porous substrate included in the separator for a secondary battery may be easily formed, thereby contributing to thermal safety and electrochemical performance improvement of the battery.

The polymer may be included in an amount of 1 to 99 wt % based on the total weight of the separator manufacturing composition. Specifically, the polymer may be included in an amount of 10 to 90 wt %, or 20 to 70 wt %, based on the total weight of the separator manufacturing composition.

The diluent is a thinner and refers to a low molecular weight organic material with a molecular structure similar to that of the polymer included in the separator manufacturing composition. The diluent may be implemented by using various materials and is not particularly limited: a suitable diluent may be an organic liquid that forms a single phase with the polymer at an extrusion processing temperature. In some implementations, for example, such a suitable diluent may include aliphatic hydrocarbons or cyclic hydrocarbons such as Nonane, Decane, Decalin, a paraffin oil, and a paraffin wax; phthalic acid esters such as Dibutyl Phthalate, Dihexyl Phthalate, and Dioctyl Phthalate; fatty acids having 10 to 20 carbon atoms such as a palmitic acid, a stearic acid, an oleic acid, and a linoleic acid; and fatty acid alcohols having 10 to 20 carbon atoms such as palmitate alcohol, stearate alcohol, and oleic acid alcohol; and mixtures thereof may be applied thereto.

The content of the diluent in the separator manufacturing composition is not particularly limited, but, for example, the content of the diluent in the separator manufacturing composition may be 20 to 99 wt %, 30 to 80 wt %, or 40 to 60 wt % based on the total weight of the separator manufacturing composition.

As described above, the separator composition may further include polar powder particles. The polar powder particles are inorganic powder particles included in a three-phase separator manufacturing composition, and may act as a nucleus for forming pores, thereby contributing to the formation of an excellent microporous structure in the separator. The polar powder particles may be inorganic powder particles having a relatively high dielectric constant value. Specifically, the polar powder particles may have a dielectric constant value of 3 to 5000, and for example, 10 to 3000. More specifically, the polar powder particles may include at least one of calcium carbonate ($CaCO_3$), silicon dioxide ($SiO_2$), aluminum oxide ($Al_2O_3$), zirconium oxide ($ZrO_2$), hafnium oxide ($HfO_2$), hafnium silicate ($HfSiO_4$), tantalum pentoxide ($Ta_2O_5$), lanthanum oxide ($La_2O_3$), lanthanum aluminate ($LaAlO_3$), niobium pentoxide ($Nb_2O_5$), titanium dioxide ($TiO_2$), barium titanate ($BaTiO_3$), or strontium titanate ($SrTiO_3$).

The polar powder particles may be included in an amount of 20 to 80 wt % based on 100 wt % of the total weight of the polymer and the diluent. Furthermore, the powder particles may be included in an amount of 20 to 50 wt % based on the total weight of the separator manufacturing composition.

An operation of molding the separator manufacturing composition for forming a separator manufacturing sheet may be performed. For example, the separator manufacturing composition is formed through roll mixing milling and by melting and extruding the separator manufacturing composition after the roll mixing milling, and by molding the separator manufacturing composition to form the separator manufacturing sheet. Specifically, the operation of molding the separator manufacturing composition for forming a separator manufacturing sheet may be performed. For example, the separator manufacturing composition is formed through the roll mixing milling and is melted and extruded using a compound, a roll mixing milling machine, or a mixer. In this case, the polymer, the diluent, etc., may be blended in advance and put into the compounder, or may be input from separated suppliers, respectively.

A temperature at which the separator manufacturing composition is melt and extruded may be 160° C. to 250° C., 180° C. to 230° C., and 190° C. to 220° C. When the temperature is excessively low, the polymer may not be sufficiently melted, which may cause problems in processing and dispersion. On the other hand, when the temperature is excessively high, the polymer may be oxidized by heat, resulting in a decrease in molecular weight and discoloration.

A method of molding the melted and extruded separator manufacturing composition into a separator manufacturing sheet is not particularly limited, and a general casting method or a calendaring method may be used. The extruded sheet may be cooled down from a high temperature (e.g., 160 to 250° C.) to a room temperature, and in this way a sheet having a certain thickness is formed.

The operation of molding the separator manufacturing composition for forming a separator manufacturing sheet may be performed by allowing the roll mixing milling of the separator manufacturing composition, and by melting and extruding the separator manufacturing composition after the roll mixing milling, and then, cooling and molding the separator manufacturing composition to form the separator manufacturing sheet. In this case, the separator manufacturing sheet may be cooled at 25 to 60° C. Accordingly, this may appropriately induce phase separation of components in the separator manufacturing sheet.

The manufacturing method of a separator for a secondary battery may further include an operation of applying an ultrasonic treatment to the separator manufacturing sheet, between (1) the operation of molding a separator manufacturing composition to form a separator manufacturing sheet and (2) the operation of extracting a diluent from a separator manufacturing sheet with a polar aprotic organic solvent. In this case, the cooling process may be performed: before the ultrasonic treatment is applied to the separator manufacturing sheet; simultaneously with applying the ultrasonic treatment; or after the ultrasonic treatment is applied.

When the ultrasonic treatment is performed during the process of manufacturing a separator for a secondary battery, the pores may form a passage interconnected with each other while minimizing an effect on porosity and pore size. In this case, the shapes of the pores and the passages may be controlled differently according to the ultrasonic treatment conditions. Accordingly, the performance of the finally manufactured separator may also be appropriately adjusted according to a purpose and design thereof, and the ultrasonic treatment conditions may also be adjusted to be within an appropriate range in consideration of the performance of the manufactured separator. Hereinafter, the ultrasonic treatment conditions applied to the manufacturing method of a separator for a secondary battery based on an embodiment will be described in detail.

A frequency during the ultrasonic treatment may be 1 to 100 kHz. Specifically, the frequency of the ultrasonic treatment may be 10 to 60 kHz, and may be 20 to 30 kHz. In some implementations, a frequency range of ultrasonic waves is 20 to 20,000 kHz. In some embodiments of the disclosed technology, the pore shape may be appropriately formed by adjusting the frequency range during the ultrasonic treatment. When a frequency value during the ultrasonic treatment is within the above-described range, by appropriately forming a whirlwind or screw shape of the passage in the separator to a certain concentration degree, it may be possible for the lithium ions to move with excellent rotational acceleration without degrading the movement speed of the lithium ions passing through the passage.

An output power during the ultrasonic treatment may be 50 W to 200 W. Specifically, the output power during the ultrasonic treatment may be 70 W to 150 W, and may be 90 W to 110 W. An output power value during the ultrasonic treatment is a decisive factor in uniformly forming a whirlwind-shaped or screw-shaped pore passage in an upper portion and a lower portion of the separator. When the output power value is excessively low during the ultrasonic treatment, there is a substantial limitation to forming the whirlwind-shaped or screw-shaped pore passage through interconnection between pores. On the other hand, when the output power is excessively high during the ultrasonic treatment, the pore size may become excessively large to cause problems in the safety of the separator, and a lifting phenomenon may occur to result in a problem during the process. Accordingly, when the output power value during the ultrasonic treatment is within the above-described range, it may be possible to appropriately form an interconnection passage between pores without any process problem within a range in which the size of the pores formed in the separator does not become excessively large.

An exposure time during the ultrasonic treatment may be 5 to 70 seconds. Specifically, the exposure time during the ultrasonic treatment may be 10 to 60 seconds, or may be 20 to 50 seconds. When the exposure time during the ultrasonic treatment is within the above-described range, the interconnection passages between pores may be formed in a short period of time, thereby ensuring an excellent level of productivity when manufacturing the separator.

During the ultrasonic treatment, the speed of the ultrasonic waves may be 0.1 to 40 mm/s. Specifically, the speed of the ultrasonic waves during the ultrasonic treatment may be 1 to 20 mm/s, 1.5 to 10 mm/s, 2 to 9 mm/s, and 3 to 7 mm/s. When the speed of ultrasonic waves is less than a specific speed, an expected effect through the ultrasonic treatment may be reduced, and when the ultrasonic speed is excessively high, the interconnection passages between the pores may be improperly formed. Accordingly, when the speed of the ultrasonic waves during the ultrasonic treatment is within the above-described range, the speed of the ultrasonic treatment may be appropriately adjusted, thereby appropriately and sufficiently securing the pore interconnection passage formation time.

A sonication distance during the ultrasonic treatment may be 10 to 1000 mm, 50 to 500 mm, and 70 to 150 mm. During the ultrasonic treatment, as the sonication distance gets longer and longer, the pore interconnection passage may be formed as desired, but process costs may increase, and also, as the sonication distance becomes longer, the improvement of the expected effect may be further reduced. Accordingly, when the sonication distance during the ultrasonic treatment is within the above-described range, the process costs may be adjusted to be within an appropriate range while forming the pore interconnection passages, and accordingly, economic feasibility may be ensured while improving the performance of the separator.

The manufacturing method of the separator for a secondary battery may further include an operation of stretching the separator manufacturing sheet. In this case, the operation of stretching the separator manufacturing sheet may be performed before or after the operation of extracting a diluent from the separator manufacturing sheet, or may be performed simultaneously with the operation thereof. The separator manufacturing sheet may be molded into a film by performing the operation of stretching the separator manufacturing sheet; and the operation of extracting a diluent from the separator manufacturing sheet.

A process of stretching the sheet may be performed through tools such as a tenter and the like, and the tools are not specifically limited as long as they can properly stretch the sheet. Furthermore, in the process of stretching the sheet, the sheet may be stretched 0.1 to 5 times, 0.5 to 3 times, or 0.7 to 1.5 times in a mechanical direction (MD), and the sheet may be stretched 0.5 to 10 times, 1 to 5 times, or 1.1 to 3 times in a width direction TD.

In the process of extracting the diluent, an extraction method thereof is not particularly limited, and general solvent extraction methods such as immersion, a solvent spray, and ultrasonic may be applied respectively or in combination. In this case, the content of the diluent remaining in the separator after the extraction may be 1 wt % or less.

The method of manufacturing a separator for a secondary battery may further include an operation (S4) of heat-fixing the film. In this case, a heat-fixing temperature may be 100° C. to 150° C., and a heat-fixing time may be 10 to 180 minutes.

Separator for Secondary Battery

A separator for a secondary battery may be manufactured by a manufacturing method discussed above.

The secondary battery separator has an appropriate porosity, and whirlwind-shaped or screw-shaped passages through which pores having an appropriate size are interconnected are formed in the separator. Accordingly, the separator satisfies the characteristics required for the separator in a secondary battery and exhibits excellent performance.

An average porosity value P of the separator may be 30% to 70%. When the average porosity value of the separator is adjusted to be within the above-described range, the porosity of the separator may be adjusted to be high within an appropriate range to increase the content of an electrolyte, thereby ensuring excellent ion conduction characteristics. Furthermore, since the porosity is controlled within a range that is not excessively high, safety may also be ensured by mitigating an occurrence of problems such as tearing of the separator.

An average pore diameter value D of the separator may be 0.01 μm to 0.1 μm. When the average pore diameter value of the separator is adjusted to be within the above-described range, a pore size may be adjusted to be within a range that is not excessively large while ensuring the ion conduction characteristics of the separator within an excellent range, thereby ensuring cell safety as well as preventing transition metal ions other than lithium ions from passing through the pores.

An air permeability value G of the separator may be 10 to 240 sec/100 cc. Specifically, the air permeability value G of the separator may be 100 sec/100 cc or more, 150 sec/100 cc or more, 170 sec/100 cc or more, 235 sec/100 cc or less, and 200 sec/100 cc or less. As the air permeability value G is an amount of time (sec) it takes for all gases of a certain volume (100 cc) to pass through a certain area when gas (generally, air) of a certain volume (100 cc) passes through the certain area at a certain pressure, it is typically referred to as a Gurley Number or a Gurley Value, and denotes a value measured by performing a Gurley test by a method such as ASTM D726. A lower air permeability value G denotes that the same amount of gas passes through the separator in a short time, which normally shows that the ion conduction characteristics of the separator are excellent. Accordingly, when the air permeability value of the separator is within the above-described range, the ion conduction characteristics of the separator may be significantly excellent.

A thickness of the separator may be 1 μm to 50 μm. Specifically, the thickness of the separator may be 10 μm to 30 μm. When the thickness of the separator is within the above-described range, the separator may have high strength, thereby may substantially mitigating an occurrence of tearing due to external impact as well as securing safety. Furthermore, due to a thin thickness of the separator, the energy density and battery capacity of the secondary battery may be improved, and an internal resistance of the battery may also be reduced.

The separator may include a porous substrate, and the porous substrate may be a polyolefin-based porous substrate. The polyolefin-based porous substrate may be a substrate having a plurality of pores and commonly used in electrochemical devices. For example, the polyolefin-based porous substrate may be selected from the group consisting of a polyethylene single layer, a polypropylene single layer, a polyethylene/polypropylene double layer, a polypropylene/polyethylene/polypropylene triple film, and a polyethylene/polypropylene/polyethylene triple film, but the disclosed technology is not limited thereto. When the separator includes the above-described porous substrate, the separator may have an excellent shutdown function that prevents a short circuit between a cathode and an anode in the event of abnormal heat generation inside and outside the battery, thus contributing to the improvement of the thermal safety of the battery, and also, the separator may maintain an original state thereof even at high voltages and organic solvents, thus having excellent electrochemical stability.

The separator for a secondary battery may have a cell AC-IR value of 1.3 mΩ or less. Specifically, the separator for a secondary battery may have a cell AC-IR value of 1.28 mΩ or less, 1.25 mΩ or less, 1.23 mΩ or less, 0.1 mΩ or more, and 1 mΩ or more. The cell AC-IR value denotes an impedance resistance value having capacitance of 20 Ah and measured with an AC current of 1 kHz at 25° C. for a secondary battery cell including the separator for a secondary battery. When the cell AC-IR value of the separator for a secondary battery is within the above-described range, the separator has excellent ion conduction characteristics and low resistance characteristics, which may contribute to improving the performance of a lithium secondary battery.

Lithium Secondary Battery

A lithium secondary battery based on an embodiment includes a separator for a secondary battery according to one of the above-described embodiments. Specifically, the lithium secondary battery includes a cathode and an anode, and may further include the above-described separator for a secondary battery, as a separator interposed between the cathode and the anode.

The cathode may include a lithium-transition metal oxide such as a lithium cobalt oxide ($LiCoO_2$), a lithium manganese oxide ($LiMn_2O_4$), and a lithium nickel oxide ($LiNiO_2$) as active materials, or may include a lithium-transition metal composite oxide in which some of these transition metals are substituted with other transition metals. Specifically, the cathode may include at least one selected from the group consisting of: a lithium-nickel-manganese oxide (LNMO) not including cobalt (Co) as an active material and represented by Chemical Formula such as $LiNi_xMn_{2-x}O_4$ ($0<x<1$); a lithium-permanganate oxide (LMR) not including nickel (Ni) and represented by Chemical Formulae such as $Li_{1+x}Mn_{2-x}O_4$($0<x<0.1$); a nickel-cobalt-manganese oxide (NCM) represented by Chemical Formulae such as $Li_xNi_aCo_bMn_cO_y$($0<x\leq1.1$, $2\leq y\leq2.02$, $0<a<1$, $0<b<1$, $0<c<1$, $0<a+b+c\leq1$); and a lithium-phosphate-iron oxides (LFP) represented by Chemical Formula such as $LiFePO_4$, but the disclosed technology is not limited thereto.

The anode may include at least one selected from carbon-based materials such as natural graphite and artificial graphite and silicon-based materials such as $SiO_x$($0<x<2$) and Si—C, as active materials; one or more metals selected from the group consisting of Li, Sn, Zn, Mg, Cd, Ce, Ni and Fe; alloys consisting of the metals; an oxide of the metals; and composites of the metals and carbon, but the disclosed technology is not limited thereto.

The lithium secondary battery may include the above-described separator for a secondary battery between the cathode and the anode. The secondary battery separator has excellent strength, excellent electrochemical/thermal stability, excellent ion conduction characteristics, excellent resistance characteristics, and detailed descriptions thereof will be omitted because they overlap the descriptions described above. The lithium secondary battery including the separator for a secondary battery may have excellent capacity characteristics and excellent resistance characteristics, thereby significantly excellent utilization as power sources for an electric vehicle (EV) and a hybrid electric vehicle (HEV).

EXAMPLES OF THE DISCLOSED TECHNOLOGY AND COMPARATIVE EXAMPLES

1) Manufacture of Separator

(1) Examples 1 to 4 of the Disclosed Technology

For a separator manufacturing composition, a two-phase composition including 30 wt % of polymer (polyethylene; PE) and 70 wt % of a diluent (a paraffin oil) was applied as a separator manufacturing composition of Examples 1 to 4 of the disclosed technology. The separator manufacturing composition was subject to melting and roll mixing milling at 115° C. for 30 minutes at 100 RPM, and extruded at 135° C. to manufacture a sheet having a thickness of about 20 μm. In this process, the sheet was cooled at 60° C. for 30 minutes, and ultrasonic treatment was applied to the sheets of Examples 1 to 3 of the disclosed technology except for Example 4 of the disclosed technology. In this case, the ultrasonic treatment was performed by Ultrasonic (Frequency: 28 kHZ, Power: 100 W, Exposure Time: 10 s, Ultrasonic speed: 10 mm/s, and sonication distance: 100 mm). The sheet was biaxially stretched at 115° C. by a tenter (TD: 1.3 times, and MD: 0.9 times), and methylene chloride was applied as an organic solvent, thus extracting a diluent from the sheet. Thereafter, the film was heat-fixed at 135° C. to manufacture a separator of Examples 1 to 4 of the disclosed technology having a thickness of about 20 μm.

(2) Examples 5 to 16 of the Disclosed Technology

For a separator manufacturing composition, separators of Examples 5 to 16 of the disclosed technology were manufacture in the same manner as in Examples 1 to 4 of the disclosed technology (including the ultrasonic treatment), based on 100 parts by weight of a two-phase composition for manufacturing separator, including 30 wt % of polyethylene (PE) as a polymer and 70 wt % of a paraffin oil as a diluent, except that a three-phase composition for manufacturing separator (a polymer content in the composition: 20 wt %, a diluent content therein: 47 wt %; and a powder particles content therein: 33% wt) to which 50 parts by weight of powder particles of the same kind as shown in Table 1 below based on an embodiment is added is applied to Examples 5 to 16 of the disclosed technology. In this case, the types of polar powder particles for each example are as shown in Table 1 below.

(3) Comparative Examples 1 to 6

Comparative Examples 1 to 6 were manufactured in the same manner as in Examples 1 to 4 of the disclosed technology (the two-phase composition), and a diluent was extracted with an organic solvent shown in Table 1 below to manufacture separators of Comparative Examples 1 to 6. In this case, ultrasonic treatment was applied to sheets of Comparative Examples 1 to 5 except for Comparative Example 6.

TABLE 1

| | Organic Solvent | | Powder Particles | | Ultrasonic |
|---|---|---|---|---|---|
| | Type | Dielectric Constant/ protic or aprotic | Type | Dielectric Constant | treatment status |
| Example 1 of the disclosed technology | Acetone | 20/aprotic | — | — | ○ |
| Example 2 of the disclosed technology | Chloroacetone | 29.8/aprotic | — | — | ○ |
| Example 3 of the disclosed technology | Dimethylformamide | 36/aprotic | — | — | ○ |
| Example 4 of the disclosed technology | Dimethylformamide | 36/aprotic | — | — | X |
| Example 5 of the disclosed technology | Acetone | 20/aprotic | $SiO_2$ | 3.9 | ○ |
| Example 6 of the disclosed technology | Acetone | 20/aprotic | $Al_2O_3$ | 3.9 | ○ |
| Example 7 of the disclosed technology | Acetone | 20/aprotic | $ZrO_2$ | 29 | ○ |
| Example 8 of the disclosed technology | Acetone | 20/aprotic | $HfO_2$ | 25 | ○ |
| Example 9 of the disclosed technology | Acetone | 20/aprotic | $HfSiO_4$ | 11 | ○ |
| Example 10 of the disclosed technology | Acetone | 20/aprotic | $Ta_2O_5$ | 26 | ○ |
| Example 11 of the disclosed technology | Acetone | 20/aprotic | $La_2O_3$ | 30 | ○ |
| Example 12 of the disclosed technology | Acetone | 20/aprotic | $LaAlO_3$ | 30 | ○ |
| Example 13 of the disclosed technology | Acetone | 20/aprotic | $Nb_2O_5$ | 35 | ○ |
| Example 14 of the disclosed technology | Acetone | 20/aprotic | $TiO_2$ | 95 | ○ |
| Example 15 of the disclosed technology | Acetone | 20/aprotic | $BaTiO_3$ | 1700 | ○ |
| Example 16 of the disclosed technology | Acetone | 20/aprotic | $SrTiO_3$ | 2000 | ○ |
| Comparative Example 1 | Tetrahydrofuran | 7.58 | | | ○ |
| Comparative Example 2 | Methylenechloride | 2.58 | | | ○ |
| Comparative Example 3 | Chloroform | 4.81 | | | ○ |
| Comparative Example 4 | Cyclohexane | 2 | | | ○ |

TABLE 1-continued

| | Organic Solvent | | Powder Particles | | Ultrasonic |
|---|---|---|---|---|---|
| | Type | Dielectric Constant/ protic or aprotic | Type | Dielectric Constant | treatment status |
| Comparative Example 5 | Water | 81.1/protic | | | ○ |
| Comparative Example 6 | Water | 81.1/protic | | | X |

2) Performance Evaluation of Separators (1) Average Porosity Value P and Pore Average Diameter Value D The average porosity and the pore average diameter were measured by a porometer (manufactured by PMI Co., Ltd.: CFP 1500-AEL) for the manufactured separator and are shown in Table 2 below.

(2) Air Permeability Value G

The time it takes to pass 100 ml of air by cutting a sample of 5 cm×5 cm for the manufactured separator was measured through a ventilation measuring device (Gurley-type Densometer; manufactured by Toyoseiki Co., Ltd.), and the ventilation values are shown in Table 2 below.

(3) Resistance Characteristics

A secondary battery cell having capacitance of 20 Ah and including the manufactured separator was manufactured, and for the secondary battery cell, impedance resistance values were measured using an AC current of 1 kHz by an insulation resistance tester (HIOKI 3154) at 25° C., and accordingly, the results thereof are shown in Table 2 below.

(4) Gas Generation Amount

Secondary battery cells including the manufactured separators of Examples 2 to 4 and 15 of the disclosed technology and the separators of Comparative Examples 5 and 6 were manufactured, respectively. The secondary battery cells were left unattended for 20 weeks at a high temperature of 60° C. in a 100% SOC state, and the amount of gas generated in the cell was measured by a gas collector, and accordingly, the results thereof are shown in Table 2 below.

TABLE 2

| | Porosity (%) | Pore Average Diameter (μm) | Air Permeability (sec/100 cc) | Cell Ac-IR (mΩ) | Gas Generation Amount (ml) |
|---|---|---|---|---|---|
| Example 1 of the disclosed technology | 46 | 0.033 | 200 | 1.25 | |
| Example 2 of the disclosed technology | 46 | 0.033 | 180 | 1.15 | — |
| Example 3 of the disclosed technology | 46 | 0.033 | 160 | 1.13 | 50 |
| Example 4 of the disclosed technology | 46 | 0.033 | 200 | 1.28 | 60 |
| Example 5 of the disclosed technology | 46 | 0.035 | 190 | 1.22 | 60 |
| Example 6 of the disclosed technology | 46 | 0.035 | 190 | 1.22 | — |
| Example 7 of the disclosed technology | 46 | 0.045 | 175 | 1.15 | — |
| Example 8 of the disclosed technology | 46 | 0.044 | 175 | 1.15 | — |
| Example 9 of the disclosed technology | 46 | 0.04 | 178 | 1.18 | — |
| Example 10 of the disclosed technology | 46 | 0.043 | 176 | 1.14 | — |
| Example 11 of the disclosed technology | 46 | 0.047 | 172 | 1.13 | — |
| Example 12 of the disclosed technology | 46 | 0.046 | 173 | 1.14 | — |

TABLE 2-continued

| | Porosity (%) | Pore Average Diameter (μm) | Air Permeability (sec/100 cc) | Cell Ac-IR (mΩ) | Gas Generation Amount (ml) |
|---|---|---|---|---|---|
| Example 13 of the disclosed technology | 46 | 0.055 | 165 | 1.08 | — |
| Example 14 of the disclosed technology | 46 | 0.066 | 161 | 1.07 | — |
| Example 15 of the disclosed technology | 46 | 0.088 | 155 | 1.05 | — |
| Example 16 of the disclosed technology | 46 | 0.094 | 144 | 1.03 | 45 |
| Comparative Example 1 | 46 | 0.033 | 220 | 1.27 | — |
| Comparative Example 2 | 46 | 0.033 | 230 | 1.28 | — |
| Comparative Example 3 | 46 | 0.033 | 230 | 1.28 | — |
| Comparative Example 4 | 46 | 0.033 | 250 | 1.3 | — |
| Comparative Example 5 | 46 | 0.033 | 180 | 1.16 | 200 |
| Comparative Example 6 | 46 | 0.033 | 230 | 1.3 | 250 |

When comparing Examples of the disclosed technology 1 to 4 and Comparative Examples 1 to 4, the separators of Comparative Examples 1 to 4 manufactured by applying an organic solvent having a relatively low dielectric constant value during the extraction of the diluent dad the same porosity and pore average diameter as the separators of Examples 1 to 4 of the disclosed technology, but the air permeability value G and the cell AC-IR value were relatively high in the separators of Comparative Examples 1 to 4. In consideration thereof, it is determined that when extracting a diluent having a relatively polar organic solvent, an interconnection shape between the pores may formed, thereby manufacturing a separator having excellent ion conduction characteristics and excellent resistance characteristics.

Furthermore, when comparing Examples 1 to 4 of the disclosed technology and Comparative Examples 5 and 6, the separators of Comparative Examples 5 and 6 that were polar due to high dielectric constant values thereof, but were manufactured by applying water that is a protic solvent, as an organic solvent in the extraction of the diluent represented a higher amount of gas generated than that of the separators of Examples 1 to 4 of the disclosed technology. This is determined to be due to the fact that hydrofluoric acid (HF) formed when a large amount of hydrogen ions ($H^+$) generated by applying the protic organic solvent is coupled to fluorine ions ($F^-$) present inside the secondary battery destroys a SEI layer on an electrode surface and accelerates gas generation.

Meanwhile, referring to Examples 5 to 16 of the disclosed technology, it is determined that even when a separator is manufactured with a composition for manufacturing a three-phase separator further comprising polar powder particles, it may be possible to provide a separator for a secondary battery having excellent performance. Specifically, it is determined that as polar powder particles having a relatively high dielectric constant value is applied, the pore average diameter value D of the manufactured separator tends to be relatively high, and the air permeability value G and the cell AC-IR value tend to be relatively low. Accordingly, it is determined that it may be possible to appropriately adjust the type of polar powder particles according to the design purpose of the separator in consideration of both safety and ion conduction characteristics.

Furthermore, when comparing Examples of the disclosed technology 3 and 4, it was shown in that even if separators are manufactured with the same composition for manufacturing a separator, there was a difference in ion conduction characteristics depending on whether the ultrasonic treatment was performed or not. Specifically, although the separators of Examples of the disclosed technology 3 and 4 have the same porosity value P and the same pore average diameter value D, the separator of Example 3 of the disclosed technology to which the ultrasonic treatment is applied showed to have a lower air permeability value (G) and a lower cell AC-IR value than the separator of Example 4 of the disclosed technology in which the ultrasonic treatment is not applied. Accordingly, when the ultrasonic treatment is applied in manufacturing the separator, the interconnection shape between the pores may be formed more excellently, thereby determining that ion conduction characteristics may be further improved within a range that fails to reduce safety.

In consideration of the results described above, when manufacturing the separator, the diluent was extracted through the polar aprotic organic solvent, and if necessary, 1) when the polar powder particles are included in the composition for manufacturing a separator, or 2) when the ultrasonic treatment is applied in the process of manufacturing the separator, it may be possible to provide the separator for secondary battery having excellent safety, ion conductivity, and resistance characteristics.

The disclosed technology can be implemented in rechargeable secondary batteries and modules of rechargeable secondary batteries that are widely used in battery-powered devices or systems, including, e.g., digital cameras, mobile phones, notebook computers, hybrid vehicles, electric vehicles, uninterruptible power supplies, battery storage power stations, and others including battery power storage for solar panels, wind power generators and other green tech power generators. Specifically, the disclosed technology can be implemented in some embodiments to provide improved electrochemical devices such as a battery used in various power sources and power supplies, thereby mitigating climate changes in connection with uses of power sources and power supplies. Lithium secondary batteries based on the disclosed technology can be used to address various adverse effects such as air pollution and greenhouse emissions by powering electric vehicles (EVs) as alternatives to vehicles using fossil fuel-based engines and by providing battery-based energy storage systems (ESSs) to store renewable energy such as solar power and wind power.

Only specific examples of implementations of certain embodiments of the disclosed technology are described. Variations, improvements and enhancements of the disclosed embodiments and other embodiments may be made based on the disclosure of this patent document.

What is claimed is:

1. A method for manufacturing a separator for a secondary battery, comprising:

molding a separator composition to form a separator composition sheet;

applying an ultrasonic treatment to the separator composition sheet; and forming a separator by extracting a diluent from the separator composition sheet using a polar aprotic organic solvent, wherein a frequency during the ultrasonic treatment is 1 to 100 kHz, and an output power during the ultrasonic treatment is 50 W to 200 W.

2. The method of claim 1, wherein a dielectric constant value of the polar aprotic organic solvent ranges from 10 to 100.

3. The method of claim 1, wherein the polar aprotic organic solvent includes one of acetone, chloroacetone, dimethylformamide, or a combination of two or more of acetone, chloroacetone, and dimethylformamide.

4. The method of claim 1, wherein the separator composition further includes polar powder particles.

5. The method of claim 4, wherein a dielectric constant value of the polar powder particles ranges from 3 to 5000.

6. The method of claim 4, wherein the polar powder particles include at least one of calcium carbonate ($CaCO_3$), silicon dioxide ($SiO_2$), aluminum oxide ($Al_2O_3$), zirconium oxide ($ZrO_2$), hafnium oxide ($HfO_2$), hafnium silicate ($HfSiO_4$), tantalum pentoxide ($Ta_2O_5$), lanthanum oxide ($La_2O_3$), lanthanum aluminate ($LaAlO_3$), niobium pentoxide ($Nb_2O_5$), titanium dioxide ($TiO_2$), barium titanate ($BaTiO_3$), or strontium titanate ($SrTiO_3$).

* * * * *